United States Patent
Gao et al.

(10) Patent No.: US 10,056,972 B2
(45) Date of Patent: *Aug. 21, 2018

(54) OPTICAL NETWORK UNIT RESET MESSAGE

(71) Applicant: Futurewei Technologies, Inc., Plano, TX (US)

(72) Inventors: Bo Gao, Hubei (CN); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,588

(22) Filed: Jun. 21, 2017

(65) Prior Publication Data

US 2017/0366254 A1    Dec. 21, 2017

Related U.S. Application Data

(60) Provisional application No. 62/352,888, filed on Jun. 21, 2016.

(51) Int. Cl.
 *H04B 10/03*    (2013.01)
 *H04B 10/27*    (2013.01)

(52) U.S. Cl.
 CPC ............ *H04B 10/03* (2013.01); *H04B 10/27* (2013.01)

(58) Field of Classification Search
 CPC ...................................... H04B 10/03
 USPC ........................................... 398/1
 See application file for complete search history.

(56) References Cited

U.S. PATENT DOCUMENTS

| | | | |
|---|---|---|---|
| 2008/0056719 A1* | 3/2008 | Bernard | H04Q 11/0067 398/71 |
| 2011/0176806 A1* | 7/2011 | Dvir | H04B 10/69 398/58 |
| 2011/0211827 A1* | 9/2011 | Soto | H04B 10/071 398/25 |
| 2014/0233940 A1* | 8/2014 | Pitzer | H04B 10/03 398/8 |
| 2014/0321855 A1* | 10/2014 | Nors | H04Q 11/0067 398/66 |
| 2016/0056999 A1 | 2/2016 | Na et al. | |

FOREIGN PATENT DOCUMENTS

| | | |
|---|---|---|
| CN | 101873519 A | 10/2010 |
| CN | 104104519 A | 10/2014 |
| CN | 105573913 A | 5/2016 |

OTHER PUBLICATIONS

Machine Translation and Abstract of Chinese Publication No. CN101873519, Oct. 27, 2010, 8 pages.
Machine Translation and Abstract of Chinese Publication No. CN105573913, May 11, 2016, 10 pages.
(Continued)

*Primary Examiner* — Dalzid Singh
(74) *Attorney, Agent, or Firm* — Conley Rose, P.C.

(57) ABSTRACT

A low-level reset message having a reset level provides a mechanism for an optical line terminal (OLT) to remotely reset a dysfunctional optical network unit (ONU). The reset message includes a reset level field which allows the OLT to instruct the ONU to perform a reset of some or all of its hardware and software components.

10 Claims, 8 Drawing Sheets

(56) References Cited

OTHER PUBLICATIONS

Foreign Communication From a Counterpart Application, PCT Application No. PCT/CN2017/089271, English Translation of International Search Report dated Sep. 1, 2017, 4 pages.
Foreign Communication From a Counterpart Application, PCT Application No. PCT/CN2017/089271, English Translation of Written Opinion dated Sep. 1, 2017, 7 pages.
Adtran, "NGPON2 and XGS-PONS: Use of PLOAM to Reboot ONU," Jun. 20-24, 2016, 5 pages.
Adtran, "NGPONS2 and XGS-PONS: Use of PLOAM to Reboot ONU," COM 15—C 1752—E, Feb. 2015, 2 pages.
Futrewei, "Proposal of a new PLOAM to reboot ONU in G.9807.1," COM 15—C 1941—E, Sep. 2016, 4 pages.
"Series G: Transmission Systems and Media, Digital Systems and Networks, Digital Sections and digital line systems—Optical line systems for local and access networks, 10-Gigabit-capable passive optical networks (XG-PON): Transmission convergence (TC) layer specification," ITU-T, G.987.3, Jan. 2014, 146 pages.
"Series G: Transmission Systems and Media, Digital Systems and Networks, Digital Sections and digital line systems—Optical line systems for local and access networks, ONU management and control interface (OMCI) specification," ITU-T, G.988, Oct. 2012, 594 pages.
"Series G: Transmission Systems and Media, Digital Systems and Networks, Digital sections and digital line system—Optical line systems for local and access networks, 40-Gigabit-capable passive optical networks (NG-PON2): Transmission convergence layer specification," ITU-T, G989.3, Oct. 2015, 250 pages.
"Series G: Transmission Systems and Media, Digital Systems and Networks, Digital Sections and digital line systems—Optical line systems for local and access networks, 10-Gigabit-capable symmetric passive optical network (XGS-PON)," ITU-T, G.9807.1, Jun. 2016, 286 pages.
"10-Gigabit-capable symmetric passive optical network (XG-PON)," ITU-T, G.9807.1, Draft New Recommendation ITU-T G.9807.1 (ex G.XGS-PON) 1, G9807-1_(exGXGS-PON)_(N)_LC-text_rplm, May 23, 2016, 310 pages.
Office Action dated Feb. 22, 2018, 21 pages, U.S. Appl. No. 15/627,746, filed Jun. 20, 2017.

\* cited by examiner

300

| Octet | Contents | Contents |
|---|---|---|
| 1-2 | ONU-ID 301 | Directed message to one ONU or broadcast message to all ONUs. As a broadcast to all ONUs, ONU-ID = 0x03FF. A single ONU is addressed when ONU-ID is set to unicast ID, the content of bytes 5, 7-14 are ignored. |
| 3 | Message Type ID 302 | "Reset_ONU". |
| 4 | Sequence Number 303 | Eight-bit unicast or broadcast PLOAM sequence number, as appropriate. |
| 5 | Reset Scope 304 | 0x01: The ONU with this serial number needs to reset. 0x0F: The ONUs in O2-3 state need to reset. The content of bytes 7-14 are ignored. 0xFF: All ONUs need to reset. The content of bytes 7-14 are ignored. |
| 6 | Reset Level 305 | 0x01: Reboot hardware, logic, and software of the addressed ONU(s) 0x02: Reboot logic and software of the addressed ONU(s) 0x03: Reboot software of the addressed ONU(s) 0x04: The addressed ONU(s) goes to O1 state 0x05: The addressed ONU(s) discards MIBs and maintains current state 0x06: The addressed ONU(s) maintains MIBs and reconfigures services |
| 7-10 | Vendor ID 306 | See clause G.989.3/11.2.6.1. This field is inspected only when ONU-ID is set to 0x03FF (broadcast ID). |
| 11-14 | VSSN 307 | See clause G.989.3/11.2.6.2. This field is inspected only when ONU-ID is set to 0x03FF (broadcast ID). |
| 15-40 | Padding 308 | Set to 0x00 by the transmitter; treated as "don't care" by the receiver. |
| 41-48 | MIC 309 | Message integrity check, computed using the default PLOAM_IK in case of broadcast message, and using the ONU-specific derived shared PLOAM_IK in case of directed message. |

| Octet | Contents | Contents |
|---|---|---|
| 1-2 | ONU-ID 601 | Directed message to one ONU or broadcast message to all ONUs.<br>As a broadcast to all ONUs, ONU-ID = 0x03FF.<br>A single ONU is addressed when ONU-ID is set to unicast ID, the content of bytes 5, 7-13 are ignored. |
| 3 | Message Type ID 602 | 0x05, "Deactivate_ONU-ID". |
| 4 | Sequence Number 603 | Eight-bit unicast or broadcast PLOAM sequence number, as appropriate. |
| 5 | Reset Scope 604 | 0x01: The ONU with this serial number needs to reset.<br>0x0F: The ONUs in O2-3 state need to reset. The content of bytes 7-14 are ignored.<br>0xFF: All ONUs need to reset. The content of bytes 7-14 are ignored. |
| 6 | Reset Level 605 | 0x01: Reboot hardware, logic, and software of the addressed ONU(s)<br>0x02: Reboot logic and software of the addressed ONU(s)<br>0x03: Reboot software of the addressed ONU(s)<br>0x04: The addressed ONU(s) goes to O1 state<br>0x05: The addressed ONU(s) discards MIBs and maintains current state<br>0x06: The addressed ONU(s) maintains MIBs and reconfigures services |
| 7-10 | Vendor ID 606 | See clause G.989.3/11.2.6.1. This field is inspected only when ONU-ID is set to 0x03FF (broadcast ID). |
| 11-14 | VSSN 607 | See clause G.989.3/11.2.6.2. This field is inspected only when ONU-ID is set to 0x03FF (broadcast ID). |
| 15-40 | Padding 608 | Set to 0x00 by the transmitter; treated as "don't care" by the receiver. |
| 41-48 | MIC 609 | Message integrity check, computed using the default PLOAM integrity key. |

| Octet | Contents | Contents |
|---|---|---|
| 1-2 | ONU-ID 701 | 0x03FF, Broadcast ONU-ID. |
| 3 | Message Type ID 702 | 0x06, "Disable_Serial_Number". |
| 4 | Sequence Number 703 | Eight-bit broadcast PLOAM sequence number. |
| 5 | Disable/enable 704 | 0xFF: The ONU with this serial number is denied upstream access.<br>0x00: The ONU with this serial number is allowed upstream access.<br>0x0F: All tuned-in ONUs are denied upstream access. The content of bytes 6-13 are ignored.<br>0x3F: Disable_Discovery: the tuned-in ONUs in O2-3 state are denied upstream access. The content of bytes 6-13 are ignored.<br>0xF0: All tuned-in ONUs are allowed upstream access. The content of bytes 6-13 are ignored. |
| 6-9 | Vendor ID 705 | See clause 11.2.6.1. |
| 10-13 | VSSN 706 | See clause 11.2.6.2. |
| 14 | Reset Level 707 | 0x01: Reboot hardware, logic, and software of all ONUs which are denied upstream access<br>0x02: Reboot logic and software of all ONUs which are denied upstream access<br>0x03: Reboot software of all ONUs which are denied upstream access<br>0x04: All ONUs which are denied upstream access go to O1 state<br>0x05: All ONUs which are denied upstream access discard MIBs and maintain current state<br>0x06: All ONUs which are denied upstream access maintain MIBs and reconfigure services |
| 15-40 | Padding 708 | Set to 0x00 by the transmitter; treated as "don't care" by the receiver. |
| 41-48 | MIC 709 | Message integrity check, computed using the default PLOAM integrity key. |

| Octet | Contents | Contents |
|---|---|---|
| 1-6 | Destination Address 801 | |
| 7-12 | Source Address 802 | |
| 13-14 | Length/Type 803 | 0x8808 |
| 15-16 | Opcode 804 | 0x0007 |
| 17-20 | Timestamp 805 | |
| 21 | Reset Level 806 | 0x01: Reboot hardware, logic, and software of the addressed ONU(s)<br>0x02: Reboot logic and software of the addressed ONU(s)<br>0x03: Reboot software of the addressed ONU(s)<br>0x04: The addressed ONU(s) goes to O1 state<br>0x05: The addressed ONU(s) discards MIBs and maintains current state<br>0x06: The addressed ONU(s) maintains MIBs and reconfigures services |
| 22-60 | Pad/Reserved 807 | Set to 0x00 by the transmitter; treated as "don't care" by the receiver. |
| 61-64 | MIC 808 | Message integrity check, computed using the default PLOAM_IK in case of broadcast message, and using the ONU-specific derived shared PLOAM_IK in case of directed message. |

FIG. 8

OPTICAL NETWORK UNIT RESET MESSAGE

CROSS-REFERENCE TO RELATED APPLICATIONS

This application claims the benefit of U.S. Patent Application No. 62/352,888, which is titled "Optical Network Unit (ONU) Reset Message," which was filed on Jun. 21, 2016, and which is incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Passive optical networks (PONs) may provide network services such as voice, Internet, and video services to homes and businesses. In a conventional PON 100, shown in FIG. 1, optical line terminal (OLT) 110 (typically located in a service provider's central office) communicates with optical network unit (ONU) 120 (also referred to as an optical network terminal (ONT)). ONU 120 is typically located on the end-user's premises. OLT 110 and ONU 120 communicate using, among other things, physical layer operations, administration, and maintenance (PLOAM) messages 130 and ONT management and control interface (OMCI) messages 140. OMCI messages 140 are defined by Recommendation ITU-T G.988 and generally address ONU configuration, fault management and performance management for optical access system operation. PLOAM messages 130 are defined in Recommendations ITU-T G.987.3 and G.989.3 and generally address low-level negotiations between an OLT and an ONU. PLOAM messages 130 can be supported in low-level firmware, if not actually in hardware, and as such, they can be used even when an ONU is incapable of communicating using higher level OMCI messages 140.

Under normal operations, service provider personnel may remotely configure and troubleshoot an ONU, using OMCI messages 140. Service provider personnel may even instruct an ONU to reset itself using OMCI messages 140. However, there are certain fault conditions when the ONU is unable to process incoming OMCI messages 140. In such conditions, the only alternative is to restart the ONU manually, which requires either an in-person visit by the service provider's field support technician or else an attempt, over the phone, to guide an untrained customer through the ONU reset process.

SUMMARY

In an embodiment, an ONU comprises a memory configured to store a management information base (MIB), low-level software, and high-level software, a PON interface configured to communicate using PLOAM messages, and a processor coupled to the memory and the PON interface. The processor is configured to execute the low-level software and high-level software, receive a PLOAM reset message comprising a reset level, with the reset level comprising an indication of a component of the ONU to be reset, and reset the ONU according to the reset level. In some embodiments, the reset level comprises an instruction for the ONU to reset the processor, the memory, and the PON interface, and with the processor further configured to reset the processor, the memory, and the PON interface and restart the low-level software and high-level software. In some embodiments, the reset level comprises an instruction for the ONU to reset the low-level software and the high-level software and with the processor further configured to restart the low-level software and the high-level software. In some embodiments, the reset level comprises an instruction for the ONU to reset the high-level software and with the processor further configured to restart the high-level software. In some embodiments, the reset level comprises an instruction for the ONU to reset the MIB and with the processor further configured to reset the MIB. In some embodiments, the PLOAM reset message comprises an instruction for the ONU to preserve the MIB before resetting the ONU and with the processor further configured to preserve the MIB before resetting the ONU and restore the MIB after resetting the ONU. In some embodiments, the ONU comprises a current operating state, wherein the PLOAM reset message comprises a conditional reset instruction or an unconditional reset instruction, wherein the conditional reset instruction comprises an indicator of an ONU operating state, and with the processor configured to reset the ONU when the PLOAM reset message comprises the conditional reset instruction and when the current operating state corresponds to the indicator of the ONU operating state, and reset the ONU when the PLOAM reset message comprises the unconditional reset instruction.

In an embodiment, an ONU receives and processes a PLOAM reset message by receiving the PLOAM reset message comprising a reset level, with the reset level comprising an indication of a component of the ONU to be reset, and resetting the ONU according to the reset level. In some embodiments, the ONU comprises hardware, low-level software, and high-level software, wherein the reset level comprises an instruction for the ONU to reset the hardware, the low-level software, and the high-level software, and further comprising resetting the hardware, the low-level software, and the high-level software. In some embodiments, the ONU comprises low-level software and high-level software, wherein the reset level comprises an instruction for the ONU to reset the low-level software and the high-level software, and further comprising resetting the low-level software and the high-level software. In some embodiments, the ONU comprises high-level software, wherein the reset level comprises an instruction for the ONU to reset the high-level software, and further comprising resetting the high-level software. In some embodiments, the ONU comprises a MIB, wherein the reset level comprises an instruction for the ONU to reset the MIB, and further comprising resetting the MIB. In some embodiments, the ONU comprises a MIB, wherein the PLOAM reset message further comprises an instruction for the ONU to preserve the MIB before resetting the ONU, and further comprising preserving the MIB before resetting the ONU and restoring the MIB after resetting the ONU. In some embodiments, the ONU comprises a current operating state, wherein the PLOAM reset message further comprises a conditional reset instruction or an unconditional reset instruction, wherein the conditional reset instruction comprises an indicator of an ONU operating state, and further comprising resetting the ONU when the PLOAM reset message comprises the conditional reset instruction and when the current operating state corresponds to the indicator of the ONU operating state and resetting the ONU when the PLOAM reset message comprises the unconditional reset instruction.

In an embodiment, an OLT comprises a memory configured to store identity and state information about an ONU, a PON interface configured to communicate with the ONU using PLOAM messages, and a processor coupled to the memory and the PON interface. The processor is configured to create a first PLOAM reset message comprising a first reset level, with the first reset level comprising an indication of a component of the ONU to be reset, and send the first PLOAM reset message to the ONU via the PON interface. In some embodiments, the first reset level comprises an instruction for the ONU to reset hardware, low-level software, and high-level software associated with the ONU, an instruction for the ONU to reset low-level software and high-level software associated with the ONU, an instruction for the ONU to reset high-level software associated with the ONU, or an instruction for the ONU to reset a MIB associated with the ONU. In some embodiments, the processor is further configured to, prior to creating the first PLOAM reset message, detect that the ONU is not responding to OMCI messages and after sending the first PLOAM reset message, to detect that the ONU is still not responding to OMCI messages, create a second PLOAM reset message comprising a second reset level that is different from the first reset level, and send the second PLOAM reset message to the ONU via the PON interface.

In an embodiment, an OLT resets a remote ONU by creating a PLOAM reset message comprising a first reset level, with the first reset level comprising an indication of a component of the ONU to be reset, and sending the first PLOAM reset message to the ONU via a PLOAM channel. In some embodiments, the first reset level comprises an instruction for the ONU to reset hardware, low-level software, and high-level software associated with the ONU, an instruction for the ONU to reset low-level software and high-level software associated with the ONU, an instruction for the ONU to reset high-level software associated with the ONU, or an instruction for the ONU to reset a MIB associated with the ONU. In some embodiments, prior to creating the first PLOAM reset message, the ONU is further configured to detect that the ONU is not responding to OMCI messages and after sending the first PLOAM reset message, detect that the ONU is still not responding to OMCI messages, create a second PLOAM reset message comprising a second reset level that is different from the first reset level, and send the second PLOAM reset message to the ONU via the PLOAM channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 shows an embodiment of a PLOAM reset message according to an embodiment of the present disclosure.

FIG. 6 shows an embodiment of a PLOAM deactivation message according to an embodiment of the present disclosure.

FIG. 7 shows an embodiment of a PLOAM disable message according to an embodiment of the present disclosure.

FIG. 8 shows an embodiment of a MPCP reset message according to an embodiment of the present disclosure.

DETAILED DESCRIPTION

The embodiments of this disclosure are directed at remotely resetting an ONU using a PLOAM message. The disclosed PLOAM reset message includes a reset level indicator, allowing service provider personnel to specify an operation level, which may, for example, distinguish between a cold reset and a warm reset. A low-level reset message having a reset level provides a mechanism for an optical line terminal (OLT) to remotely reset a dysfunctional optical network unit (ONU). The reset message includes a reset level field which allows the OLT to instruct the ONU to perform a reset of some or all of its hardware and software components. A capability is provided for remotely rebooting an ONU when the ONU is incapable of processing an OMCI reset request message. Embodiments of the present disclosure include a PLOAM reset message suitable for resetting an ONU according to a requested reset level, together with examples of how an ONU may process the reset message. The disclosed embodiments allow service provider personnel to remotely reboot an ONU when the ONU is incapable of processing an OMCI reset request message.

Figure 1:
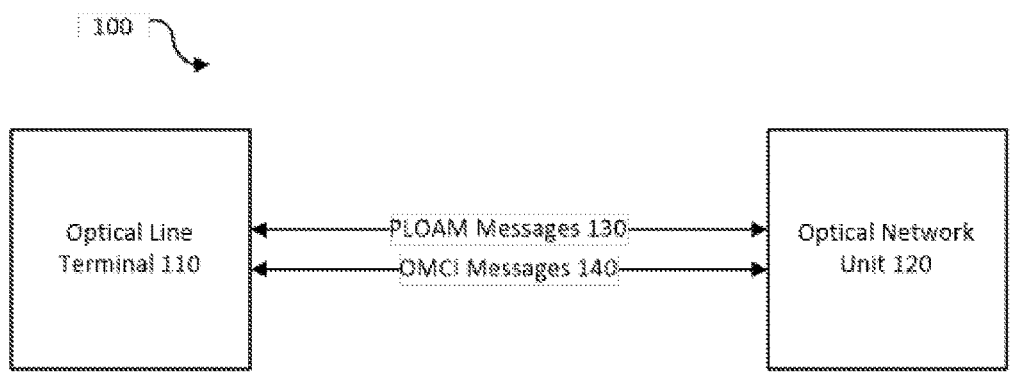
FIG. 1 shows a conventional configuration of an ONU and an OLT.
Figure 2:
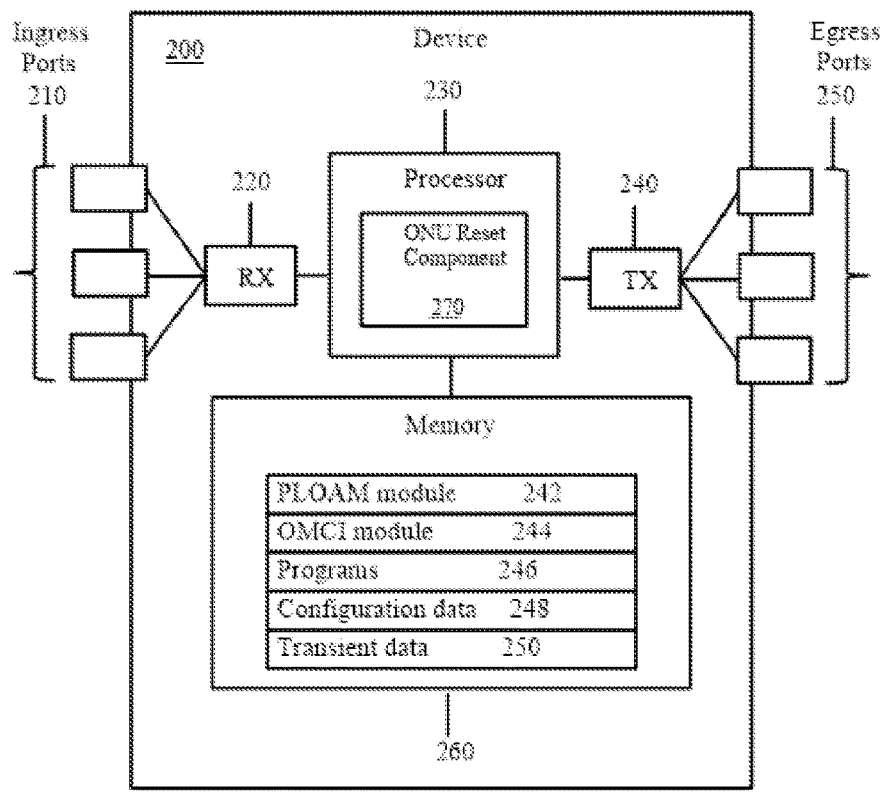
FIG. 2 shows a hardware configuration suitable for use in implementing embodiments of the present disclosure.

FIG. 2 is a schematic diagram of a device 200 according to an embodiment of the disclosure. In some embodiments, the device 200 comprises a network device 200. The device 200 is suitable for implementing the disclosed embodiments. The device 200 comprises ingress ports 210 and RXs 220 for receiving data; a processor, logic unit, or CPU 230 to process the data; TXs 240 and egress ports 250 for transmitting the data; and a memory 260 for storing the data. The device 200 may also comprise OE components and EO components coupled to the ingress ports 210, the receiver units 220, the transmitter units 240, and the egress ports 250 for ingress or egress of optical or electrical signals. Ingress ports 210 and RXs 220 connect device 200 to a PON, and as such, can comprise an optical interface, for example.

Egress ports 250 and TX 240 connect device 200 to another network or networks. When device 200 is an OLT, this other network may be the Internet or another service provider network, for example. When device 200 is an ONU, this other network may be the customer's local area network, for example. In either case, Egress ports 250 and TX 240 may comprise an electrical or optical network interface.

The processor 230 is implemented by any suitable combination of hardware, middleware, firmware, and software. The processor 230 may be implemented as one or more CPU chips, cores (e.g., as a multi-core processor), FGPAs, ASICs, and DSPs. The processor 230 is in communication with the ingress ports 210, receiver units 220, transmitter units 240, egress ports 250, and memory 260. The processor 230 comprises an ONU reset component or module 270. The ONU reset component or module 270 implements the disclosed embodiments. The inclusion of the ONU reset component or module 270 therefore provides a substantial improvement to the functionality of the device 200 and effects a transformation of the device 200 to a different state. Alternatively, the ONU reset component or module 270 is implemented as instructions stored in the memory 260 and executed by the processor 230.

Processor 230 is also coupled with memory 260, which may include instructions for PLOAM module 242, OMCI module 244, and other programs 246, together with associated configuration data 248 and transient data 250. The ONU reset component or module 270 may comprise one or more of the PLOAM module 242, OMCI module 244, programs 246, configuration data 248, and/or transient data 250. By way of example and not limitation, memory 260 may be implemented as random access memory, read-only memory, flash memory, disk-based storage, or the like, including combinations. When device 200 is an ONU, configuration data 248 may include a MIB. When device 200 is an OLT, configuration data 248 may include identification and state information about the ONUs that are connected to the OLT. When device 200 is implemented as multiple components, some functionalities may, for example, be executed by a different processor 230 within device 200 than other functionalities.

The memory 260 comprises one or more disks, tape drives, and solid-state drives and may be used as an overflow data storage device, to store programs when such programs are selected for execution, and to store instructions and data that are read during program execution. The memory 260 may be volatile and non-volatile and may be ROM, RAM, TCAM, or SRAM.

When device 200 is an ONU, configuration data 248 may include a MIB. When device 200 is an OLT, configuration data 248 may include identification and state information about the ONUs that are connected to the OLT. When device 200 is implemented as multiple components, some functionalities may, for example, be executed by a different processor 230 within device 200.

In the PON 100, a PLOAM channel is used to activate an ONU and establish an OMCI channel. An OMCI is used to control higher-layer functionalities, including ONU rebooting. There are fault conditions where the ONU fails to establish the OMCI channel or is unable to process and respond to OMCI messages even though the PLOAM channel is operational. Because the OMCI is needed for the OLT to reboot the ONU, the ONU may be left in an endless loop when the OMCI is not functioning properly.

A Disable_serial_number PLOAM message may not be sufficient because it directs the ONU in the emergency stop state (O7). The emergency stop state prevents transmitting upstream and forwarding downstream, but continues to process PLOAM messages rather than rebooting. A Deactivate PLOAM message may not be sufficient because it directs the ONU in the Initial state (O1), but does not reboot the ONU.

Disclosed herein are embodiments for PLOAM commands which reboot ONUs. The PLOAM commands may be used when the OMCI channel is not operational. In this way, both the PLOAM channel and the OMCI channel may be reset. These embodiments address rogue ONUs. The embodiments apply to XGS-PONs or any other PONs supporting rebooting of ONUs.

FIG. 3 shows PLOAM reset message 300 according to an embodiment of the present disclosure. The PLOAM reset message 300 can comprise a Reset_ONU PLOAM message. A number of the fields of PLOAM reset message 300 are common to PLOAM messages and are defined by ITU-T G.989.3. PLOAM reset message 300 in the embodiment shown includes ONU-ID 301, Message Type ID 302, Sequence Number 303, Reset Scope 304, Reset Level 305, Vendor ID 306, Vendor-Specific Serial Number (VSSN) 307, Padding 308, and Message Integrity Check (MIC) 309. ONU-ID 301 includes six reserved bits, plus an actual 10-bit ONU identifier that specifies the message recipient in the downstream direction or the message sender in the upstream direction. Message Type ID 302 indicates the type of the message and defines the semantics of the message payload. For embodiments of the present disclosure, a new Message Type ID 302 value may be assigned for the PLOAM reset message 300. Sequence Number 303 contains a sequence number counter that is used to ensure robustness of the PLOAM messaging channel. Vendor ID 306 is the first of two components of the ONU serial number; its values are assigned by the Alliance for Telecommunications Industry Solutions. VSSN (vendor-specific serial number) 307 is the second of the two components of the ONU serial number; its values are selected by ONU vendors. Padding 308 may be unused, or may be defined and used for additional information. MIC (message integrity check) 309 is used to verify the sender's identity and to prevent a forged PLOAM message attack. In some PLOAM messages, ONU-ID 301 may be used to identify a particular ONU, and in such messages, Vendor ID 306 and VSSN 307 may be zeroes or simply ignored by the receiver. However, because ONU IDs are assigned when an ONU restarts, an OLT may need to send a message to an ONU before it has been assigned an ONU ID. In such cases ONU-ID 301 of PLOAM reset message 300 may be set to 0x03FF (indicating "broadcast" mode) and Vendor ID 306 and VSSN 307 identify the specific ONU. By way of example and not limitation, PLOAM reset message 300 may be sent to an ONU which has hung before completing normal startup, in which case ONU-ID 301 will be set to broadcast mode and Vendor ID 306 and VSSN 307 will identify the specific ONU to be reset.

In some embodiments of PLOAM reset message 300, Reset Scope 304 may be used to identify a specific ONU or a set of ONUs to be reset. Reset Scope 304 can reset the ONU having the serial number as indicated by Vender ID 306 and VSSN 307. Reset Scope 304 can reset all ONUs in the PON which are in operation states 2 ("standby state") or 3 ("serial number state) (Vendor ID 306 and VSSN 307 are ignored). Or, Reset Scope 304 can reset all ONUs in the PON irrespective of their operation states (Vendor ID 306 and VSSN 307 are ignored). Operation states for ONUs, including the standby state and serial number states are defined by Recommendation ITU-T G.989.3.

In some embodiments of PLOAM reset message 300, Reset Level 305 indicates the "depth" of the reset of the ONU (or ONUs). By way of example and not limitation, Reset Level 305 may indicate a request to reset some or all of the ONU's components, include any of the following levels. Reset Level 305 can reboot the hardware, low-level software (for example, media access control (MAC) layer functionality), and higher-level software (for example, the ONU configuration software). This is effectively a "cold restart," which will result in a reset of all of the physical hardware as well as a reset of the MAC and ONU configurations. Reset Level 305 can reboot the low-level and higher-level software, which will result in a reset of the MAC and ONU configurations. Reset Level 305 can reboot the higher-level software, which will result in a reset of the ONU configuration. Or, Reset Level 305 can reset the MAC configuration without rebooting the low-level or higher-level software. Barring unforeseen problems with the ONU, rebooting the ONU will ultimately take the ONU(s) to the "initial state" where it may begin its normal startup procedures as described in ITU-T G.984.3.

One of ordinary skill will recognize that PLOAM reset message 300 may be modified without departing from the spirit of the present disclosure. By way of example and not limitation, in some embodiments, the reset message could include a flag of whether or not to preserve the current MIB, so that after a reset, the ONU may either restore the MIB or else reset the MIB to an initial configuration. Such a flag may be incorporated into Reset Scope 304, Reset Level 305, or it may be a dedicated field defined in Padding 308. Further, any agreed-upon values may be used to indicate Reset Scope 304 and Reset Level 305. Further, the size and ordering of various fields may be modified and additional message fields may be used to indicate other reset-related features.

Some service providers may develop procedures according to the flexibility provided by the multi-level reset level. By way of example and not limitation, a service provider's standard procedures may be for the OLT to send a first message that instructs the ONU to reset only its high-level software in order to limit disruption to a customer's service. Then, if the ONU fails to respond, the OLT may send PLOAM reset messages with successively deeper ONU reset levels, and ultimately instruct the ONU to perform a cold restart. For other service providers, the standard procedure for a hung ONU may always entail a cold restart.

Figure 4:
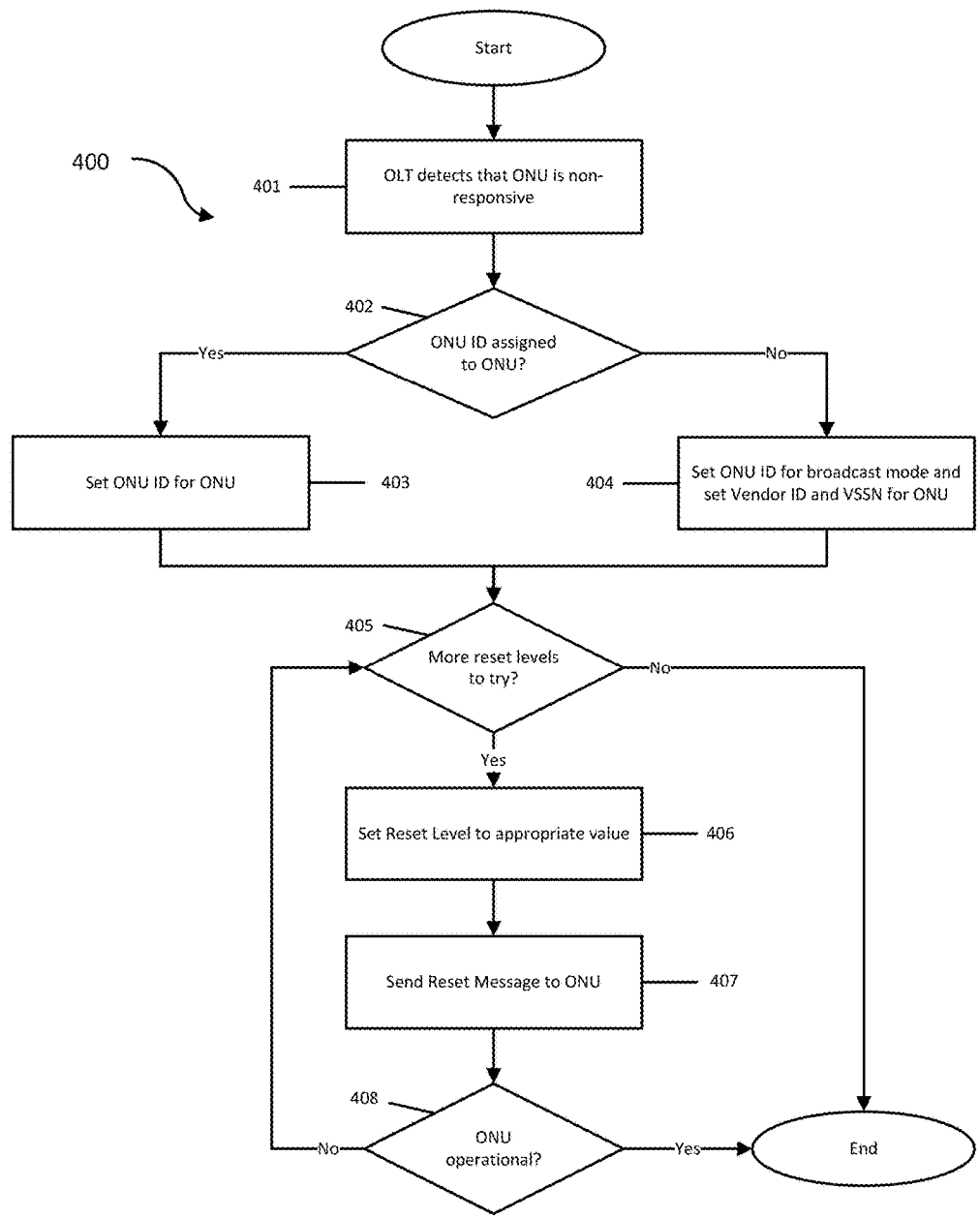
FIG. 4 shows a flowchart for preparing and sending a PLOAM reset message according to an embodiment of the present disclosure.

FIG. 4 discloses flowchart 400 showing how an OLT may make use of the PLOAM reset message. In operation 401, OLT 110 detects that ONU 120 is not responsive to OMCI messages and should be restarted using PLOAM reset message 300.

In operation 402, OLT 110 first determines whether or not an ONU ID has been assigned to ONU 120. Typically, an OLT assigns ONU IDs to those ONUs under its control, so OLT 110 should have a record of the ONU ID assigned to ONU 120. Thus, if it has assigned an ONU ID, in operation 403 OLT 110 sets ONU ID 301 of PLOAM reset message 300 to the ONU ID for ONU 120. Otherwise in operation 404 OLT 110 sets ONU ID 301 for broadcast mode, and sets Vendor ID 306 and VSSN 307 of PLOAM reset message 300 to the vendor ID and VSSN for ONU 120, as previously discussed.

Next, in operation 405, OLT 110 determines if there are reset levels available for PLOAM reset message 300. The reset level chosen by OLT 110 may depend on OLT 110's analysis of the problem(s) being experienced by ONU 120, any PLOAM reset message 300 that OLT 110 has previously sent to ONU 120, and the service provider's troubleshooting procedures. By way of example and not limitation, OLT 110 may first attempt to reset the MAC data on ONU 120 and OLT 110, then it may attempt to reboot the high-level software, then it may attempt to reboot the low-level software, and finally, it may attempt a cold restart by instructing ONU 120 to cycle its power.

In operation 406, OLT 110 fills in Reset Level 305 of PLOAM reset message 300 and in operation 407 sends the message to ONU 120. In some variations of this embodiment, OLT 110 may also set a flag in PLOAM reset message 300 to instruct OLT 110 either to retain or discard some or all of its MIB.

In operation 408, OLT 110 determines whether or not ONU 120 has successfully restarted and is operating normally. If so, then OLT 110 may be finished with flowchart 400. If not, then OLT 110 may return to operation 405 to determine if lower-level Reset Levels are appropriate. If lower-level Reset Levels are available, then OLT 110 may repeat operations 406-408. If all reset attempts have failed, including a power cycle, then OLT 110 may exit, leaving ONU 120 non-operational, in which case ONU 120 may require manual attention by the service provider.

One of ordinary skill in the art will recognize a number of variations in the implementation of the embodiment of flowchart 400. By way of example and not limitation, as noted previously, PLOAM reset message 300 may be structured as shown in FIG. 3, while in other embodiments, the size and ordering of various fields may be modified and additional message fields may be used to indicate other reset-related features. Further, a given service provider operating ONU 120 may empirically determine that certain ONU models may not respond to a first PLOAM reset message at a given level, but may respond to a second or third PLOAM reset message at the same reset level; thus, flowchart 400 may be modified to repeat operations 405-408 multiple times using the same reset level. Further, a given service provider operating ONU 120 may determine that certain ONU models seldom respond to a simple restart of the higher-level software and usually require a cold restart. Thus, for operation 406, the reset level may always be set to cold restart. Further, ONU 120 may require different amounts of time to restart depending on Reset Level 305, so there may be a variable-length delay period inserted between operations 407 and 408. Further, after determining that ONU 120 is operational in operation 408, OLT 110 may send OMCI messages to ONU 120 to initiate diagnostics, retrieve error logs, and other tasks to verify that ONU 120 is fully operational. Further in operation 401, OLT 110 may automatically detect that ONU 120 is non-responsive, for example, through the use of "keep-alive" messages. In other variations, the service provider operating OLT 110 may initiate flowchart 400 manually after receiving a service request from a customer. Further, if OLT 110 makes multiple attempts to reset ONU 120 using ONU 120's assigned ONU ID (set in message 300 in operation 403), it may repeat the attempts using broadcast mode for ONU-ID 301 and set Vendor ID 306 and VSSN 307 accordingly.

Figure 5:
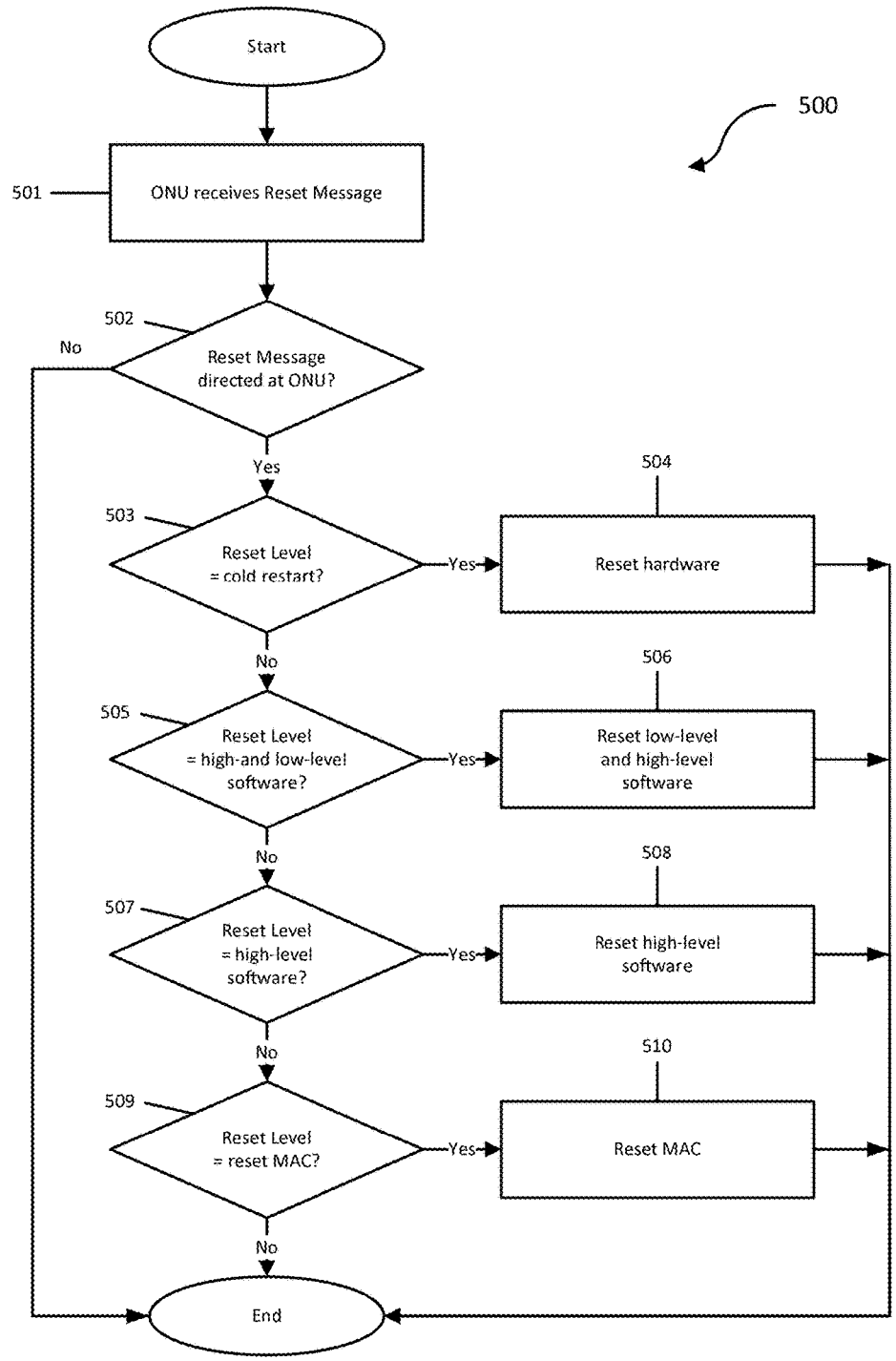
FIG. 5 shows a flowchart for processing receipt of a PLOAM reset message according to an embodiment of the present disclosure.

FIG. 5 shows an embodiment of processing by ONU 120 in receipt of PLOAM reset message 300 sent by OLT 110. In operation 501 of flowchart 500, ONU 120 receives PLOAM reset message 300.

In operation 502, ONU 120 examines PLOAM reset message 300 to determine if it is directed to ONU 120. As noted previously, ONU ID 301 field may have an ONU ID matching ONU 120's ID. Alternatively, the ONU field may indicate broadcast mode, in which case ONU 120 must examine the Vendor ID and VSSN fields to determine if the message is directed to ONU 120. If the message is not directed to ONU 120, then PLOAM reset message 300 is ignored and processing ends. Otherwise, processing moves forward to operation 503 where ONU 120 examines Reset Level 305.

In operation 503, ONU 120 determines if a cold restart has been requested. If so, then in operation 504, ONU performs a cold restart. Depending on the hardware and software configuration of ONU 120, this may involve cycling the power of ONU 120 or it may involve sending reset signals to all of the electrical components of ONU 120.

In either case, ONU 120 may then begin its normal startup sequence as defined by Recommendation ITU-T G.989.3.

In operation 505, ONU 120 determines if a reset of the low-level and high-level software has been requested. If so, then in operation 506, ONU 120 resets the low-level and high-level software. Depending on the hardware and software configuration of ONU 120, this may involve terminating individual programs and/or program groups, and/or restarting all or part of the operating system, and ONU 120 may then begin its normal startup sequence as defined by Recommendation ITU-T G.989.3.

In operation 507, ONU 120 determines if a reset of the high-level software has been requested. If so, then in operation 508, ONU 120 resets the high-level software. Depending on the hardware and software configuration of ONU 120, this may involve terminating individual programs and/or program groups, however, not all functionality of ONU 120 may be terminated, and ONU 120 may or may not go through its normal startup sequence as defined by Recommendation ITU-T G.989.3.

In operation 509, ONU 120 determines if a MAC reset has been requested. If so, then in operation 510, ONU 120 resets its MAC data but may not otherwise terminate or restart programs.

One of ordinary skill in the art will recognize a number of variations in the implementation of the embodiment of flowchart 500. By way of example and not limitation, as noted previously, PLOAM reset message 300 may be structured as shown in FIG. 3, while in other embodiments, the size and ordering of various fields may be modified and additional message fields may be used to indicate other reset-related features. Further, in some variations, ONU 120 may reset according to Reset Level 305 immediately upon receipt of PLOAM reset message 300, while in other variations, it may perform housekeeping chores, event logging, and such before resetting. In some variations, ONU 120 may defer resetting until any in-progress sessions, operations, or data transfers (such as telephone calls, for example) have been completed. In some variations, prior to restarting, ONU 120 may store its MIB tables and then after restarting, reload the stored MIB tables, while in other variations, ONU 120 may clear its MIB tables on restart. In some variations, the decision of whether or not to restore MIB tables may be indicated by a flag in PLOAM reset message 300.

Thus disclosed herein is a means for an ONU to store a MIB, low-level software, and high-level software, a means for the ONU to communicate using PLOAM messages, and a means for the ONU to execute the low-level software and high-level software, receive a PLOAM reset message comprising a reset level with the reset level comprising an indication of a component of the ONU to be reset, and reset the ONU according to the reset level. Further disclosed herein is a means for an ONU to receive a PLOAM reset message comprising a reset level, wherein the reset level comprises an indication of a component of the ONU to be reset, and a means to reset the ONU according to the reset level. Further disclosed herein is a means for an OLT to store identity and state information about an ONU, a means for the OLT to communicate with the ONU using PLOAM messages, a means to create a first PLOAM reset message, wherein the first PLOAM reset message comprises a first reset level and wherein the first reset level comprises an indication of a component of the ONU to be reset, and a means to send the first PLOAM reset message to the ONU. Further disclosed herein is a means for an OLT to create a first PLOAM reset message, wherein the first PLOAM reset message comprises a first reset level, wherein the first reset level comprises an indication of a component of the ONU to be reset, and a means to send the first PLOAM reset message to the ONU via a PLOAM channel.

FIG. 6 shows an embodiment of a PLOAM deactivation message 600 according to an embodiment of the present disclosure. The figure can comprise a Deactivate_ONU-ID PLOAM message 600.

FIG. 7 shows an embodiment of a PLOAM disable message 700 according to an embodiment of the present disclosure. The figure can comprise a Disable_Serial_Number PLOAM message 700. The messages 600 and 700 are described in ITU-T G.9807.1 Draft, May 23, 2016, which is incorporated by reference herein.

FIG. 8 shows an embodiment of a MPCP reset message 800 according to an embodiment of the present disclosure. The figure can comprise a Reset_ONU MPCP message 800.

Figure 9:
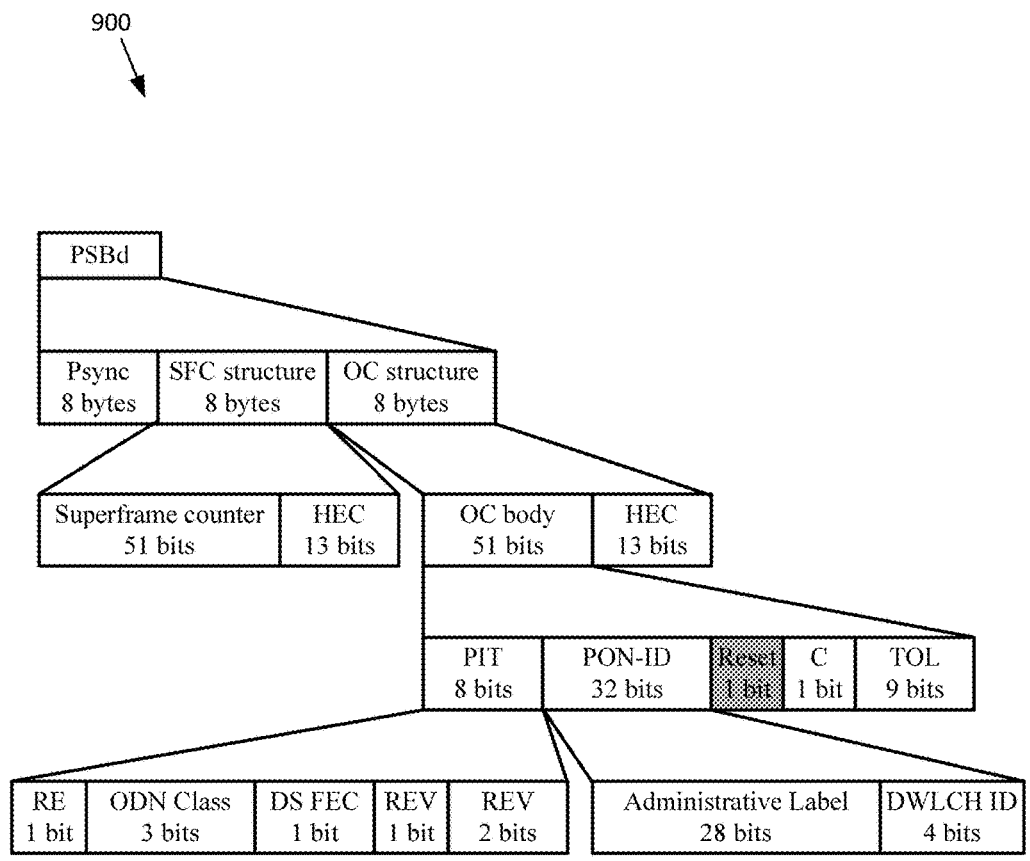
FIG. 9 shows an embodiment of a PBSd field according to an embodiment of the present disclosure.

FIG. 9 shows an embodiment of a PBSd field 900 according to an embodiment of the present disclosure. The PBSd field 900 may be used when the PHY adaptation sublayer is operational, but the PLOAM channel and the OMCI channel are not operational. The Reset field in the PBSd field 900 may be newly defined.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The following abbreviations, acronyms, and initialisms apply:

ASIC: application specific integrated circuit
C: reference point
CO: central office
CPU: central processing unit
DS: downstream
DSP: digital signal processor
DWLCH: downstream wavelength channel
EO: electrical-to-optical
FCS: frame check sequence
FGPA: field-programmable gate array
Gb/s: gigabits per second
HEC: header error control
ID: identifier
IK: integrity key
ITU-T: International Telecommunication Union Telecommunication Standardization Sector
Mb/s: megabits per second
MIC: message integrity check
MPCP: Multi-Point Control Protocol
OC: operation control
ODN: optical distribution network
OE: optical-to-electrical
OLT: optical line terminal
OMCI: ONT management and control interface
ONT: optical network terminal
ONU: optical network unit
Opcode: operational code
P: protocol
PHY: physical
PIT: PON-ID type
PLOAM: physical layer operation, administration, and maintenance
PON: passive optical network PSB: physical synchronization block
PSBd: PSB downstream
Psync: physical synchronization sequence
P2MP: point-to-multipoint
RAM: random-access memory
RE: reach extender
REV: reserved
RN: remote node
ROM: read-only memory
RX: receiver unit
SeqNo: sequence number
SFC: superframe counter
SN: serial number
SRAM: static RAM
TCAM: ternary content-addressable memory
TDM: time-division multiplexing
TDMA: time-division multiple access
TOL: transmit optical level
TWDM: time- and wavelength-division multiplexing
TX: transmitter unit
VSSN: vendor-specific SN
WDM: wavelength-division multiplexing
WDMA: wavelength-division multiple access
XGS-PON: 10 Gb/s symmetrical PON.

What is claimed is:

1. An optical network unit (ONU) comprising:
a memory configured to store a management information base (MIB), low-level software, and high-level software;
a passive optical network (PON) interface configured to communicate using physical layer operations, administration, and maintenance (PLOAM) messages; and
a processor coupled to the memory and the PON interface, with the processor configured to:
execute the low-level software and high-level software;
receive a PLOAM reset message comprising a reset level with the reset level comprising an indication of a component of the ONU to be reset; and
reset the ONU according to the reset level.

2. The ONU of claim 1, wherein the reset level comprises an instruction for the ONU to reset the processor, the memory, and the PON interface, and with the processor further configured to reset the processor, the memory, and the PON interface and restart the low-level software and high-level software.

3. The ONU of claim 1, wherein the reset level comprises an instruction for the ONU to reset the low-level software and the high-level software and with the processor further configured to restart the low-level software and the high-level software.

4. The ONU of claim 1, wherein the reset level comprises an instruction for the ONU to reset the high-level software and with the processor further configured to restart the high-level software.

5. The ONU of claim 1, wherein the reset level comprises an instruction for the ONU to reset the MIB and with the processor further configured to reset the MIB.

6. The ONU of claim 1, wherein the PLOAM reset message further comprises an instruction for the ONU to preserve the MIB before resetting the ONU and with the processor further configured to:
preserve the MIB before resetting the ONU; and
restore the MIB after resetting the ONU.

7. The ONU of claim 1, wherein the ONU comprises a current operating state, wherein the PLOAM reset message further comprises a conditional reset instruction or an unconditional reset instruction, wherein the conditional reset instruction comprises an indicator of an ONU operating state, and with the processor further configured to:
reset the ONU when the PLOAM reset message comprises the conditional reset instruction and when the current operating state corresponds to the indicator of the ONU operating state; and
reset the ONU when the PLOAM reset message comprises the unconditional reset instruction.

8. An optical line terminal (OLT) comprising:
a memory configured to store identity and state information about an optical network unit (ONU);
a passive optical network (PON) interface configured to communicate with the ONU using physical layer operations, administration, and maintenance (PLOAM) messages; and
a processor coupled to the memory and the PON interface, with the processor configured to:
create a first PLOAM reset message comprising a first reset level, with the first reset level comprising an indication of a component of the ONU to be reset; and
send the first PLOAM reset message to the ONU via the PON interface.

9. The OLT of claim 8, wherein the first reset level comprises an instruction for the ONU to reset hardware, low-level software, and high-level software associated with the ONU, an instruction for the ONU to reset low-level software and high-level software associated with the ONU, an instruction for the ONU to reset high-level software associated with the ONU, or an instruction for the ONU to reset a management information base (MIB) associated with the ONU.

10. The OLT of claim 8, wherein prior to creating the first PLOAM reset message, the processor is further configured to detect that the ONU is not responding to optical network terminal management and control interface (OMCI) messages and wherein after sending the first PLOAM reset message, the processor is further configured to detect that the ONU is still not responding to OMCI messages;
create a second PLOAM reset message comprising a second reset level that is different from the first reset level; and
send the second PLOAM reset message to the ONU via the PON interface.

* * * * *

UNITED STATES PATENT AND TRADEMARK OFFICE
CERTIFICATE OF CORRECTION

PATENT NO. : 10,056,972 B2
APPLICATION NO. : 15/629588
DATED : August 21, 2018
INVENTOR(S) : Bo Gao et al.

Page 1 of 1

It is certified that error appears in the above-identified patent and that said Letters Patent is hereby corrected as shown below:

On the Title Page

Item (72) Inventors: should read:
Bo Gao, Wuhan (CN); Yuanqiu Luo, Cranbury, NJ (US)

Page 2, Column 1, Other Publications, Lines 11-12, should read:
Futurewei, "Proposal of a new PLOAM to reboot ONU in G. 9807.1," COM 15-C 1941-E, Sep. 2016, 4 pages.

Signed and Sealed this
Second Day of October, 2018

Andrei Iancu
*Director of the United States Patent and Trademark Office*